(12) United States Patent
Althoff et al.

(10) Patent No.: US 7,539,694 B1
(45) Date of Patent: May 26, 2009

(54) CONCURRENTLY SEARCHING AND MANIPULATING BINARY TREES

(75) Inventors: Markus Althoff, Achern (DE); Devin Gharibian-Saki, Ettlingen (DE)

(73) Assignee: Marvell International Ltd., Hamilton (BM)

( * ) Notice: Subject to any disclaimer, the term of this patent is extended or adjusted under 35 U.S.C. 154(b) by 638 days.

(21) Appl. No.: 11/218,147

(22) Filed: Sep. 1, 2005

Related U.S. Application Data

(60) Provisional application No. 60/669,448, filed on Apr. 8, 2005, provisional application No. 60/650,316, filed on Feb. 4, 2005.

(51) Int. Cl.
G06F 17/30 (2006.01)
(52) U.S. Cl. .......................................... 707/101; 707/3
(58) Field of Classification Search ................. 707/100, 707/200, 2–5, 101
See application file for complete search history.

(56) References Cited

U.S. PATENT DOCUMENTS

| | | | |
|---|---|---|---|
| 5,263,124 A * | 11/1993 | Weaver et al. ............... | 382/159 |
| 5,717,921 A | 2/1998 | Lomet et al. | |
| 6,047,283 A | 4/2000 | Braun | |
| 6,298,340 B1 * | 10/2001 | Calvignac et al. .............. | 707/3 |
| 6,480,849 B1 | 11/2002 | Lee et al. | |
| 6,735,600 B1 | 5/2004 | Andreev et al. | |
| 6,751,746 B1 | 6/2004 | Jain et al. | |
| 6,792,432 B1 | 9/2004 | Kodavalla et al. | |
| 6,834,275 B2 | 12/2004 | Kanai et al. | |
| 7,395,256 B2 * | 7/2008 | Ji et al. .......................... | 707/3 |

OTHER PUBLICATIONS

H.T. Kung and Philip L. Lehman, "Concurrent Manipulation of Binary Search Trees", Carnegie-Mellon University, ACM Transactions on Database Systems, vol. 5, No. 3, Sep. 1980, pp. 354-382.*
Concurrent Manipulation of Binary Search Trees; H. T. Kung and Philip L. Lehman; Carnegie-Mellon University; ACM Transactions on Database Systems, vol. 5, No. 3, Sep. 1980; pp. 354-382.
Scalable Networking: Network Protocol Offload—Introducing TCP Chimney; VinHEC 2004 Version—Apr. 9, 2004, pp. 1-31.
A Trie-Based Algorithm for IP Lookup Problem; Pinar Altin Yilmaz, Andrey Belenkiy, Necedet Uzun, New Jersey Institute of Technology, Nitin Gogate, Mehmet Toy, Fujitsu Network Communications; 2000; 6 pages.

* cited by examiner

*Primary Examiner*—Cheryl Lewis

(57) ABSTRACT

An apparatus having corresponding methods and computer programs comprises a memory comprising a plurality of locations each to store a node for a binary tree comprising a plurality of the nodes; a classifier to search the tree, wherein the classifier requires one node processing interval to process one of the nodes; and a processor to modify the tree, wherein the processor (a) modifies a pointer that indicates a first one of the nodes to not indicate the first one of the nodes instead, wherein a second one of the nodes is a descendant of the first one of the nodes and is separated from the first one of the nodes by N pointers, (b) waits at least N+1 node processing intervals after (a), and (c) after (b), modifies a pointer that indicates the second one of the nodes to not indicate the second one of the nodes instead.

44 Claims, 12 Drawing Sheets

CONCURRENTLY SEARCHING AND MANIPULATING BINARY TREES

CROSS-REFERENCE TO RELATED APPLICATIONS

This application claims the benefit of U.S. Provisional Patent Application Ser. No. 60/650,316 filed Feb. 4, 2005 and Ser. No. 60/669,448 filed Apr. 8, 2005, the disclosures thereof incorporated by reference herein in their entirety.

BACKGROUND

The present invention relates generally to binary trees. More particularly, the present invention relates to concurrently searching and manipulating AVL trees.

SUMMARY

In general, in one aspect, the invention features an apparatus comprising a memory comprising a plurality of locations each to store a node for a binary tree comprising a plurality of the nodes; a classifier to search the tree, wherein the classifier requires one node processing interval to process one of the nodes; and a processor to modify the tree, wherein the processor (a) identifies a first one of the nodes about which the binary tree is to be rotated, wherein a second one of the nodes is a descendant of the first one of the nodes and has a first pointer that indicates a third one of the nodes and a second pointer that indicates a fourth one of the nodes, and wherein the side of the second one of the nodes from which the third one of the nodes descends is the same as the side of the first one of the nodes from which the second one of the nodes descends; (b) creates a copy of the second one of the nodes; (c) causes pointers of the copy to indicate the first and third nodes; (d) modifies a pointer that indicates the first one of the nodes to indicate the copy instead; (e) after (d), waiting at least two node processing intervals; (f) after (e), modifies a pointer that indicates the second one of the nodes to indicate the fourth one of the nodes instead; (g) after (f), waits at least one node processing interval; (h) modifies the second pointer to indicate the first one of the nodes instead; and (i) modifies a pointer that indicates the copy to indicate the second one of the nodes instead.

In some embodiments, the binary tree is selected from the group consisting of: an AVL tree; and a red and black tree. In some embodiments, the processor deletes the copy. Some embodiments comprise an arbiter to control access to the memory by the processor. Some embodiments comprise an offload engine; a non-offload queue; and a receive circuit to receive packets of data; wherein the classifier directs each of the packets of data to one of the offload engine and the non-offload queue according to the tree. In some embodiments, the receive circuit comprises a media access controller. Some embodiments comprise a network device comprising the apparatus. In some embodiments, the network device is selected from the group consisting of: a network router; a network interface controller; and a network switch.

In general, in one aspect, the invention features a method for performing a single rotation in a binary tree comprising a plurality of nodes, wherein the tree is accessed by a search process that requires one node processing interval to process one of the nodes, the method comprising: (a) identifying a first one of the nodes about which the binary tree is to be rotated, wherein a second one of the nodes is a descendant of the first one of the nodes and has a first pointer that indicates a third one of the nodes and a second pointer that indicates a fourth one of the nodes, and wherein the side of the second one of the nodes from which the third one of the nodes descends is the same as the side of the first one of the nodes from which the second one of the nodes descends; (b) creating a copy of the second one of the nodes; (c) causing pointers of the copy to indicate the first and third nodes; (d) modifying a pointer that indicates the first one of the nodes to indicate the copy instead; (e) after step (d), waiting at least two node processing intervals; (f) after step (e), modifying a pointer that indicates the second one of the nodes to indicate the fourth one of the nodes instead; (g) after step (f), waiting at least one node processing interval; (h) modifying the second pointer to indicate the first one of the nodes instead; and (i) modifying a pointer that indicates the copy to indicate the second one of the nodes instead.

In some embodiments, the binary tree is selected from the group consisting of: an AVL tree; and a red and black tree. Some embodiments comprise deleting the copy.

In general, in one aspect, the invention features an apparatus comprising: a memory comprising a plurality of locations each to store a node for a binary tree comprising a plurality of the nodes; a classifier to search the tree, wherein the classifier requires one node processing interval to process one of the nodes; and a processor to modify the tree, wherein the processor (a) creates a copy of a first one of the nodes, wherein the first one of the nodes has a pointer that indicates a second one of the nodes; (b) modifies a pointer of a third one of the nodes that indicates the first one of the nodes to indicate the copy instead; (c) after (b), waits at least one node processing interval; (d) after (c), causes pointers of the first one of the nodes to indicate the third one of the nodes and a fourth one of the nodes, wherein the fourth one of the nodes has a pointer that indicates the third one of the nodes, and wherein a side of the third one of the nodes from which the first one of the nodes descends is not the same as a side of the fourth one of the nodes from which the third one of the nodes descends; (e) modifies a pointer that indicates the fourth one of the nodes to indicate the first one of the nodes-instead; (f) after (e), waits at least three node processing intervals; (g) after (f), modifies the pointer of the fourth one of the nodes that indicates the third one of the nodes to indicate the second one of the nodes instead; (h) after (g), waits at least one node processing interval; and (i) after (h), modifies a pointer that indicates the copy to not indicate the copy instead.

In some embodiments, the binary tree is selected from the group consisting of: an AVL tree; and a red and black tree. In some embodiments, the processor deletes the copy. Some embodiments comprise an arbiter to control access to the memory by the processor. Some embodiments comprise an offload engine; a non-offload queue; and a receive circuit to receive packets of data; wherein the classifier directs each of the packets of data to one of the offload engine and the non-offload queue according to the tree. In some embodiments, the receive circuit comprises a media access controller. Some embodiments comprise a network device comprising the apparatus. In some embodiments, the network device is selected from the group consisting of: a network router; a network interface controller; and a network switch.

In general, in one aspect, the invention features a method for performing a double rotation in a binary tree comprising a plurality of nodes, wherein the tree is accessed by a search process that requires one node processing interval to process one of the nodes, the method comprising: (a) creating a copy of a first one of the nodes, wherein the first one of the nodes has a pointer that indicates a second one of the nodes; (b) modifying a pointer of a third one of the nodes that indicates the first one of the nodes to indicate the copy instead; (c) after step (b), waiting at least one node processing interval; (d) after step (c), causing pointers of the first one of the nodes to indicate the third one of the nodes and a fourth one of the nodes, wherein the fourth one of the nodes has a pointer that indicates the third one of the nodes, and wherein a side of the third one of the nodes from which the first one of the nodes descends is not the same as a side of the fourth one of the nodes from which the third one of the nodes descends; (e) modifying a pointer that indicates the fourth one of the nodes to indicate the first one of the nodes instead; (f) after step (e), waiting at least three node processing intervals; (g) after step (f), modifying the pointer of the fourth one of the nodes that indicates the third one of the nodes to indicate the second one of the nodes instead; (h) after step (g), waiting at least one node processing interval; and (i) after step (h), modifying a pointer that indicates the copy to not indicate the copy instead.

In some embodiments, the binary tree is selected from the group consisting of: an AVL tree; and a red and black tree. Some embodiments comprise deleting the copy.

In general, in one aspect, the invention features an apparatus comprising: a memory comprising a plurality of locations each to store a node for a binary tree comprising a plurality of the nodes; a classifier to search the tree, wherein the classifier requires one node processing interval to process one of the nodes; and a processor to modify the tree, wherein the processor (a) modifies a pointer that indicates a first one of the nodes to not indicate the first one of the nodes instead, wherein a second one of the nodes is a descendant of the first one of the nodes and is separated from the first one of the nodes by N pointers, (b) waits at least N+1 node processing intervals after (a), and (c) after (b), modifies a pointer that indicates the second one of the nodes to not indicate the second one of the nodes instead.

In some embodiments, the binary tree is selected from the group consisting of: an AVL tree; and a red and black tree. Some embodiments comprise an arbiter to control access to the memory by the processor. Some embodiments comprise an offload engine; a non-offload queue; and a receive circuit to receive packets of data; wherein the classifier directs each of the packets of data to one of the offload engine and the non-offload queue according to the tree. In some embodiments, the receive circuit comprises a media access controller. In some embodiments, a network device comprises the apparatus. In some embodiments, the network device is selected from the group consisting of: a network router; a network interface controller; and a network switch.

In general, in one aspect, the invention features a method for modifying a binary tree comprising a plurality of nodes, wherein the tree is accessed by a search process that requires one node processing interval to process one of the nodes, the method comprising: (a) modifying a pointer that indicates a first one of the nodes of the tree to not indicate the first one of the nodes instead, wherein a second one of the nodes is a descendant of the first one of the nodes and is separated from the first one of the nodes by N pointers; (b) waiting at least N+1 node processing intervals after step (a); and (c) after step (b), modifying a pointer that indicates the second one of the nodes to not indicate the second one of the nodes instead.

In some embodiments, the binary tree is selected from the group consisting of: an AVL tree; and a red and black tree.

In general, in one aspect, the invention features an apparatus comprising: a memory comprising a plurality of locations each to store a node for a binary tree comprising a plurality of the nodes; a classifier to search the tree, wherein the classifier requires one node processing interval to process one of the nodes; and a processor to modify the tree, wherein the processor (a) identifies a first one of the nodes; (b) creates a copy of a second one of the nodes, wherein the second one of the nodes is a descendant of the first one of the nodes, (c) modifies a pointer that indicates the second one of the nodes to indicate the copy instead, (d) after (c), waits at least one node processing interval, (e) after (d), causes the pointers of the second one of the nodes to indicate nodes indicated by pointers of the first one of the nodes, and (f) modifies a pointer that indicates the first one of the nodes to indicate the second one of the nodes instead.

In some embodiments, the binary tree is selected from the group consisting of: an AVL tree; and a red and black tree. In some embodiments, the processor deletes the first one of the nodes. In some embodiments, the processor deletes the copy. In some embodiments, the processor does not delete the copy until the classifier returns to a root of the tree. In some embodiments, the processor deletes the first one of the nodes after the classifier returns to the root of the tree. In some embodiments, the processor modifies a pointer that indicates the copy to indicate a descendant of the copy instead. In some embodiments, the processor selects the second one of the nodes for deletion according to values of the nodes. Some embodiments comprise an arbiter to control access to the memory by the classifier and the processor. Some embodiments comprise an offload engine; a non-offload queue; and a receive circuit to receive packets of data; wherein the classifier directs each of the packets of data to one of the offload engine and the non-offload queue according to the tree. In some embodiments, the receive circuit comprises a media access controller. In some embodiments, a network device comprises the apparatus. In some embodiments, the network device is selected from the group consisting of: a network router; a network interface controller; and a network switch.

In general, in one aspect, the invention features a method for removing a first node from a binary tree comprising a plurality of the nodes, wherein the tree is accessed by a search process that requires one node processing interval to process one of the nodes, the method comprising: (a) creating a copy of a second one of the nodes, wherein the second one of the nodes is a descendant of the first node; (b) modifying a pointer that indicates the second one of the nodes to indicate the copy instead; (c) after step (b), waiting at least one node processing interval; (d) after step (c), causing the pointers of the second one of the nodes to indicate nodes indicated by pointers of the first node; and (e) modifying a pointer that indicates the first node to indicate the second one of the nodes instead.

In some embodiments, the binary tree is selected from the group consisting of: an AVL tree; and a red and black tree. Some embodiments comprise deleting the first node. Some embodiments comprise deleting the copy. Some embodiments comprise after step (e), waiting for the search process to return to a root of the tree before deleting the copy. Some embodiments comprise deleting the first node after the search process returns to the root of the tree. Some embodiments comprise modifying a pointer that indicates the copy to indicate a descendant of the copy instead. Some embodiments comprise selecting the second one of the nodes for deletion according to values of the nodes.

In general, in one aspect, the invention features an apparatus comprising: memory means comprising a plurality of locations each for storing a node for a binary tree comprising a plurality of the nodes; means for searching the tree, wherein the means for searching requires one node processing interval to process one of the nodes; and means for modifying the tree, wherein the means for modifying (a) identifies a first one of the nodes about which the binary tree is to be rotated, wherein a second one of the nodes is a descendant of the first one of the nodes and has a first pointer that indicates a third one of the nodes and a second pointer that indicates a fourth one of the nodes, and wherein the side of the second one of the nodes from which the third one of the nodes descends is the same as the side of the first one of the nodes from which the second one of the nodes descends; (b) creates a copy of the second one of the nodes; (c) causes pointers of the copy to indicate the first and third nodes; (d) modifies a pointer that indicates the first one of the nodes to indicate the copy instead; (e) after (d), waiting at least two node processing intervals; (f) after (e), modifies a pointer that indicates the second one of the nodes to indicate the fourth one of the nodes instead; (g) after (f), waits at least one node processing interval; (h) modifies the second pointer to indicate the first one of the nodes instead; and (i) modifies a pointer that indicates the copy to indicate the second one of the nodes instead.

In some embodiments, the binary tree is selected from the group consisting of: an AVL tree; and a red and black tree. In some embodiments, the means for modifying deletes the copy. Some embodiments comprise means for controlling access to the memory by the means for modifying. Some embodiments comprise means for receiving packets of data; means for processing the packets of data; and means for storing the packets of data; wherein the means for searching directs each of the packets of data to one of the means for processing and the means for storing according to the tree. Some embodiments comprise a network device comprising the apparatus. In some embodiments, the network device is selected from the group consisting of: a network router; a network interface controller; and a network switch.

In general, in one aspect, the invention features a computer program for performing a single rotation in a binary tree comprising a plurality of nodes, wherein the tree is accessed by a search process that requires one node processing interval to process one of the nodes, the computer program comprising: (a) identifying a first one of the nodes about which the binary tree is to be rotated, wherein a second one of the nodes is a descendant of the first one of the nodes and has a first pointer that indicates a third one of the nodes and a second pointer that indicates a fourth one of the nodes, and wherein the side of the second one of the nodes from which the third one of the nodes descends is the same as the side of the first one of the nodes from which the second one of the nodes descends; (b) creating a copy of the second one of the nodes; (c) causing pointers of the copy to indicate the first and third nodes; (d) modifying a pointer that indicates the first one of the nodes to indicate the copy instead; (e) after step (d), waiting at least two node processing intervals; (f) after step (e), modifying a pointer that indicates the second one of the nodes to indicate the fourth one of the nodes instead; (g) after step (f), waiting at least one node processing interval; (h) modifying the second pointer to indicate the first one of the nodes instead; and (i) modifying a pointer that indicates the copy to indicate the second one of the nodes instead.

In some embodiments, the binary tree is selected from the group consisting of: an AVL tree; and a red and black tree. Some embodiments comprise deleting the copy.

In general, in one aspect, the invention features an apparatus comprising: memory means comprising a plurality of locations each for storing a node for a binary tree comprising a plurality of the nodes; means for searching the tree, wherein the means for searching requires one node processing interval to process one of the nodes; and means for modifying the tree, wherein the means for modifying (a) creates a copy of a first one of the nodes, wherein the first one of the nodes has a pointer that indicates a second one of the nodes; (b) modifies a pointer of a third one of the nodes that indicates the first one of the nodes to indicate the copy instead; (c) after (b), waits at least one node processing interval; (d) after (c), causes pointers of the first one of the nodes to indicate the third one of the nodes and a fourth one of the nodes, wherein the fourth one of the nodes has a pointer that indicates the third one of the nodes, and wherein a side of the third one of the nodes from which the first one of the nodes descends is not the same as a side of the fourth one of the nodes from which the third one of the nodes descends; (e) modifies a pointer that indicates the fourth one of the nodes to indicate the first one of the nodes instead; (f) after (e), waits at least three node processing intervals; (g) after (f), modifies the pointer of the fourth one of the nodes that indicates the third one of the nodes to indicate the second one of the nodes instead; (h) after (g), waits at least one node processing interval; and (i) after (h), modifies a pointer that indicates the copy to not indicate the copy instead.

In some embodiments, the binary tree is selected from the group consisting of: an AVL tree; and a red and black tree. In some embodiments, the means for modifying deletes the copy. Some embodiments comprise means for controlling access to the memory means by the means for modifying. Some embodiments comprise means for receiving packets of data; means for processing the packets of data; and means for storing the packets of data; wherein the means for searching directs each of the packets of data to one of the means for processing and the means for storing according to the tree. Some embodiments comprise a network device comprising the apparatus. In some embodiments, the network device is selected from the group consisting of: a network router; a network interface controller; and a network switch.

In general, in one aspect, the invention features a computer program for performing a double rotation in a binary tree comprising a plurality of nodes, wherein the tree is accessed by a search process that requires one node processing interval to process one of the nodes, the computer program comprising: (a) creating a copy of a first one of the nodes, wherein the first one of the nodes has a pointer that indicates a second one of the nodes; (b) modifying a pointer of a third one of the nodes that indicates the first one of the nodes to indicate the copy instead; (c) after step (b), waiting at least one node processing interval; (d) after step (c), causing pointers of the first one of the nodes to indicate the third one of the nodes and a fourth one of the nodes, wherein the fourth one of the nodes has a pointer that indicates the third one of the nodes, and wherein a side of the third one of the nodes from which the first one of the nodes descends is not the same as a side of the fourth one of the nodes from which the third one of the nodes descends; (e) modifying a pointer that indicates the fourth one of the nodes to indicate the first one of the nodes instead; (f) after step (e), waiting at least three node processing intervals; (g) after step (f), modifying the pointer of the fourth one of the nodes that indicates the third one of the nodes to indicate the second one of the nodes instead; (h) after step (g), waiting at least one node processing interval; and (i) after step (h), modifying a pointer that indicates the copy to not indicate the copy instead.

In some embodiments, the binary tree is selected from the group consisting of: an AVL tree; and a red and black tree. Some embodiments comprise deleting the copy.

In general, in one aspect, the invention features an apparatus comprising: memory means comprising a plurality of locations each for storing a node for a binary tree comprising a plurality of the nodes; means for searching the tree, wherein the means for searching requires one node processing interval to process one of the nodes; and means for modifying to modify the tree, wherein the means for modifying (a) modifies a pointer that indicates a first one of the nodes to not indicate the first one of the nodes instead, wherein a second one of the nodes is a descendant of the first one of the nodes and is separated from the first one of the nodes by N pointers, (b) waits at least N+1 node processing intervals after (a), and (c) after (b), modifies a pointer that indicates the second one of the nodes to not indicate the second one of the nodes instead.

In some embodiments, the binary tree is selected from the group consisting of: an AVL tree; and a red and black tree. Some embodiments comprise means for controlling access to the memory means by the means for modifying. Some embodiments comprise means for receiving packets of data; means for processing the packets of data; and means for storing the packets of data; wherein the means for searching directs each of the packets of data to one of the means for processing and the means for storing according to the tree. Some embodiments comprise a network device comprising the apparatus. In some embodiments, the network device is selected from the group consisting of: a network router; a network interface controller; and a network switch.

In general, in one aspect, the invention features a computer program for modifying a binary tree comprising a plurality of nodes, wherein the tree is accessed by a search process that requires one node processing interval to process one of the nodes, the computer program comprising: (a) modifying a pointer that indicates a first one of the nodes of the tree to not indicate the first one of the nodes instead, wherein a second one of the nodes is a descendant of the first one of the nodes and is separated from the first one of the nodes by N pointers; (b) waiting at least N+1 node processing intervals after step (a); and (c) after step (b), modifying a pointer that indicates the second one of the nodes to not indicate the second one of the nodes instead. In some embodiments, the binary tree is selected from the group consisting of: an AVL tree; and a red and black tree.

In general, in one aspect, the invention features an apparatus comprising: memory means comprising a plurality of locations each for storing a node for a binary tree comprising a plurality of the nodes; means for searching the tree, wherein the means for searching requires one node processing interval to process one of the nodes; and means for modifying the tree, wherein the means for modifying (a) identifies a first one of the nodes; (b) creates a copy of a second one of the nodes, wherein the second one of the nodes is a descendant of the first one of the nodes, (c) modifies a pointer that indicates the second one of the nodes to indicate the copy instead, (d) after (c), waits at least one node processing interval, (e) after (d), causes the pointers of the second one of the nodes to indicate nodes indicated by pointers of the first one of the nodes, and (f) modifies a pointer that indicates the first one of the nodes to indicate the second one of the nodes instead.

In some embodiments, the binary tree is selected from the group consisting of: an AVL tree; and a red and black tree. In some embodiments, the means for modifying deletes the first one of the nodes. In some embodiments, the means for modifying deletes the copy. In some embodiments, the means for modifying does not delete the copy until the means for searching returns to a root of the tree. In some embodiments, the means for modifying deletes the first node after the means for searching returns to the root of the tree. In some embodiments, the means for modifying modifies a pointer that indicates the copy to indicate a descendant of the copy instead. In some embodiments, the means for modifying selects the second one of the nodes for deletion according to values of the nodes. Some embodiments comprise means for controlling access to the memory means by the means for searching and the means for modifying. Some embodiments comprise means for receiving packets of data; means for processing the packets of data; and means for storing the packets of data; wherein the means for searching directs each of the packets of data to one of the means for processing and the means for storing according to the tree. Some embodiments comprise a network device comprising the apparatus. In some embodiments, the network device is selected from the group consisting of: a network router; a network interface controller; and a network switch.

In general, in one aspect, the invention features a computer program for removing a first node from a binary tree comprising a plurality of the nodes, wherein the tree is accessed by a search process that requires one node processing interval to process one of the nodes, the computer program comprising: (a) creating a copy of a second one of the nodes, wherein the second one of the nodes is a descendant of the first node; (b) modifying a pointer that indicates the second one of the nodes to indicate the copy instead; (c) after step (b), waiting at least one node processing interval; (d) after step (c), causing the pointers of the second one of the nodes to indicate nodes indicated by pointers of the first node; and (e) modifying a pointer that indicates the first node to indicate the second one of the nodes instead.

In some embodiments, the binary tree is selected from the group consisting of: an AVL tree; and a red and black tree. Some embodiments comprise deleting the first node. Some embodiments comprise deleting the copy. Some embodiments comprise, after step (e), waiting for the search process to return to a root of the tree before deleting the copy. Some embodiments comprise deleting the first node after the search process returns to the root of the tree. Some embodiments comprise modifying a pointer that indicates the copy to indicate a descendant of the copy instead. Some embodiments comprise selecting the second one of the nodes for deletion according to values of the nodes.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification references the number of the drawing in which the reference numeral first appears.

DETAILED DESCRIPTION

An AVL tree is a binary search tree where the number of levels of children in the two sub-trees of a node can differ by at most one. When the difference is greater than one, the AVL tree must be balanced using one or more manipulations such as rotations about one of the nodes.

AVL trees are commonly used where the speed of the search is important because the balancing requirement of an AVL tree minimizes the maximum number of levels in the tree, and therefore minimizes the maximum time required to search the tree. For this reason AVL trees are often used in data communications network devices for searches such as address lookups and the like. An additional requirement for AVL trees used in such devices is that the AVL tree must always be available for searching. That is, manipulation of the tree is secondary to searching the tree.

Embodiments of the present invention permit concurrently searching and manipulating binary trees such as red and black trees, AVL trees, and the like. While embodiments of the present invention are discussed in terms of AVL trees, embodiments of the present invention also apply to other sorts of binary trees such as red and black trees, AVL trees, and the like. Further, while embodiments of the present invention are discussed in terms of network devices and particular tree manipulation operations, embodiments of the present invention also apply to other uses and other tree manipulation operations.

Figure 1:
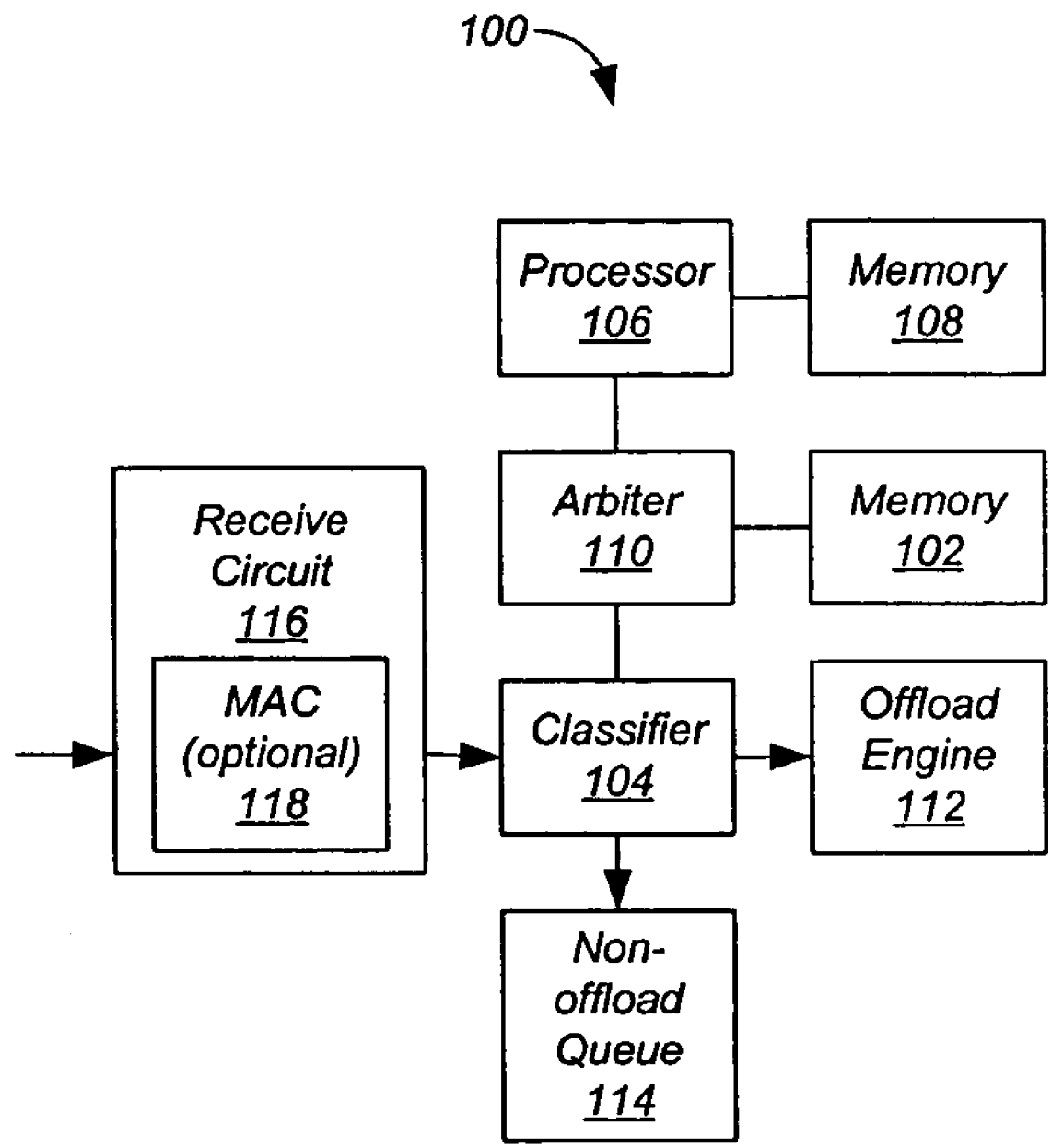
FIG. 1 shows a receive path for a network interface controller (NIC) according to a preferred embodiment of the present invention.

FIG. 1 shows a receive path for a network interface controller (NIC) 100 according to a preferred embodiment of the present invention. While embodiments of the present invention are discussed in terms of NIC 100, other embodiments can be implemented as other network devices such as network switches, network routers, and the like. NIC 100 comprises a memory 102 comprising a plurality of locations each to store a node for a binary AVL tree comprising a plurality of the nodes, a classifier 104 to search the tree, a processor 106 to modify the tree, preferably according to firmware stored in a memory 108, and an arbiter 110 to control access to memory 102 by processor 106. Due to the need for wire-speed switching, arbiter 110 gives classifier 104 priority over processor 106.

Processor 106 manipulates the tree stored in memory 102, and so has both read and write access to memory 102. Classifier 104 searches the tree, and so has read-only access to memory 102. The interval required by classifier 104 to process one of the nodes in the tree is referred to herein as a "node processing interval."

NIC 100 further comprises an offload engine 112, a non-offload queue 114, and a receive circuit 116 to receive packets of data. Offload engine 112 and non-offload queue 114 are implemented according to conventional techniques. Receive circuit 116 optionally comprises a media access controller (MAC) 118.

For each packet of data, classifier 104 extracts connection information such as transmission control protocol (TCP) connection information (referred to herein as a "tuple") from the packet and searches the tree to find a matching node. If a matching node is found, the packet belongs to an offloaded connection (that is, a connection that has been offloaded from a host to NIC 100), and so is passed to offload engine 112. Otherwise the packet is passed to a non-offload queue 114 for processing by the host.

Figure 2:
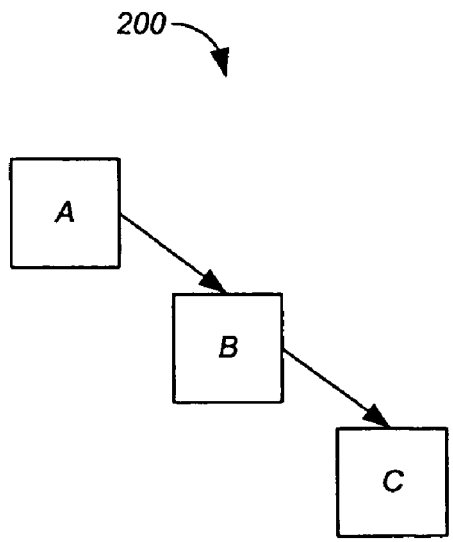
FIG. 2 shows a portion of an example binary AVL tree.

FIG. 2 shows a portion of an example binary AVL tree 200. Tree 200 comprises three nodes A, B, and C. Node A has a pointer that indicates node B. Node B has a pointer that indicates node C. While nodes A, B, and C can occupy three consecutive levels of tree 200, this is not necessarily the case, as a pointer in an AVL tree can span multiple levels during manipulation operations such as those described below.

Figure 3:
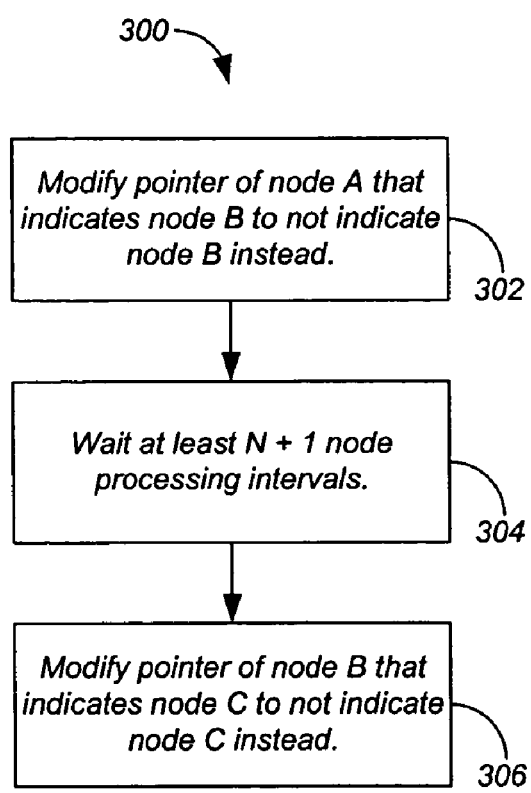
FIG. 3 shows a process for concurrently searching and manipulating the binary AVL tree of FIG. 2 according to a preferred embodiment of the present invention.

FIG. 3 shows a process 300 for concurrently searching and manipulating binary AVL tree 200 of FIG. 2 according to a preferred embodiment of the present invention. In the example of FIG. 3, processor 106 first modifies the pointer of node A that indicates node B, and then modifies the pointer of node B that indicates node C Processor 106 modifies the pointer of node A that indicates node B to not indicate node B instead (step 302). For example, processor 106 can modify the pointer to indicate another node in tree 200, or can simply null the pointer to indicate none of the nodes.

Processor 106 then waits at least N+1 node processing intervals (step 304), where N is the number of pointers that separate nodes B and C. In the current example, N=1. However, in other examples N can be any positive non-zero integer. As mentioned above, a node processing interval is the interval required by classifier 104 to process one of the nodes in tree 200.

After waiting at least N+1 node processing intervals, processor 106 modifies the pointer of node B that indicates node C to not indicate node C instead (step 306). For example, processor 106 can modify the pointer to indicate another node in tree 200, or can simply null the pointer to indicate none of the nodes.

By waiting at least N+1 node processing intervals between steps 302 and 306, processor 106 gives classifier 104 time to reach node C, ensuring that classifier 104 finds node C. Otherwise, processor 106 could modify the pointer of node B that indicates node C at a time that would prevent classifier 104 from finding node C, a flaw that is generally considered unacceptable. Process 300 thereby ensures that any node in tree 200 can be found in one pass through tree 200.

Figure 4A:
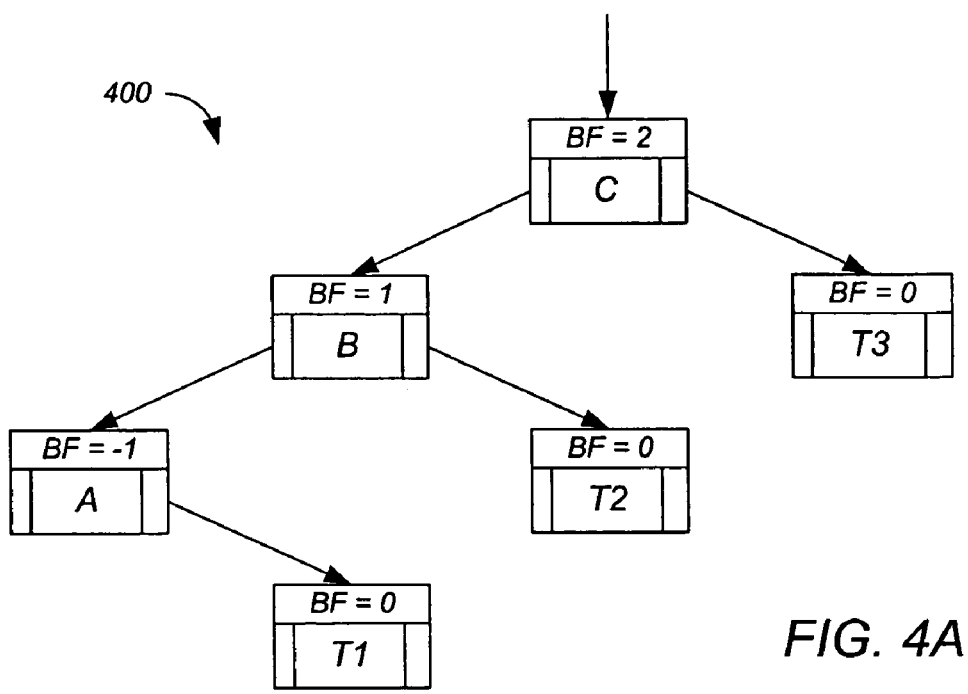
FIGS. 4A-E show a portion of an example binary AVL tree which is used to describe a single rotation operation such as a RR or LL rotation according to a preferred embodiment of the present invention.

Process 300 of FIG. 3 can be used in many different operations upon AVL trees. Now specific examples of these operations are described. FIGS. 4A-E show a portion of an example binary AVL tree 400 which is used to describe a single LL rotation operation according to a preferred embodiment of the present invention. Referring to FIG. 4A, tree 400 comprises a node C that has a right pointer that indicates a node T3 and a left pointer that indicates a node B, which has a right pointer that indicates a node T2 and a left pointer that indicates a node A, which has a right pointer that indicates a node T1. Note that the side of node B from which node A descends is the same as the side of node C from which node B descends. In the depicted LL rotation example, that side is the left side, while in a RR rotation, that side would be the right side. Balance factors BF, computed according to conventional methods, are also shown for each node.

Figure 4B:
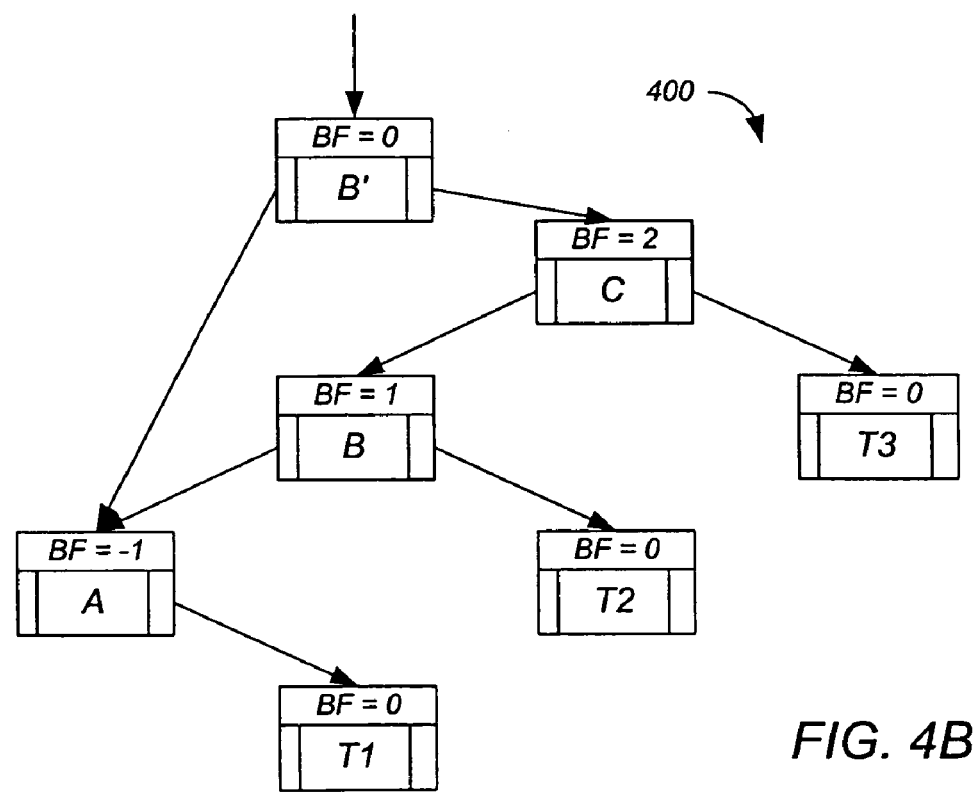
Figure 4C:
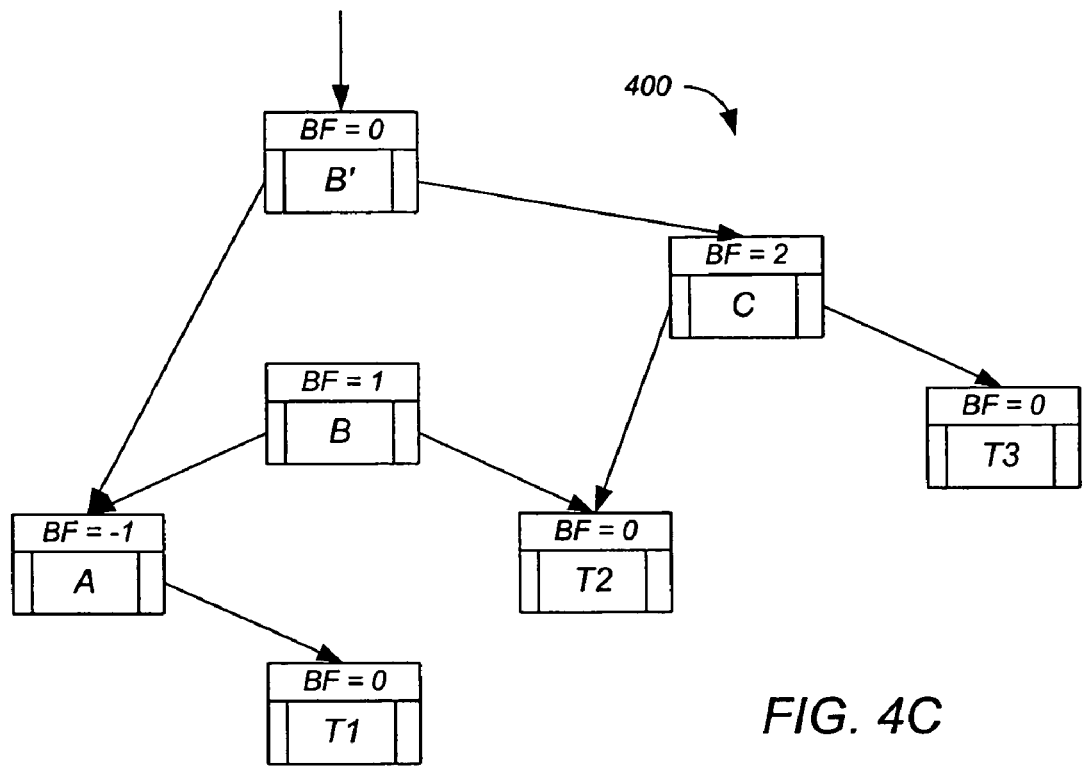
Figure 4D:
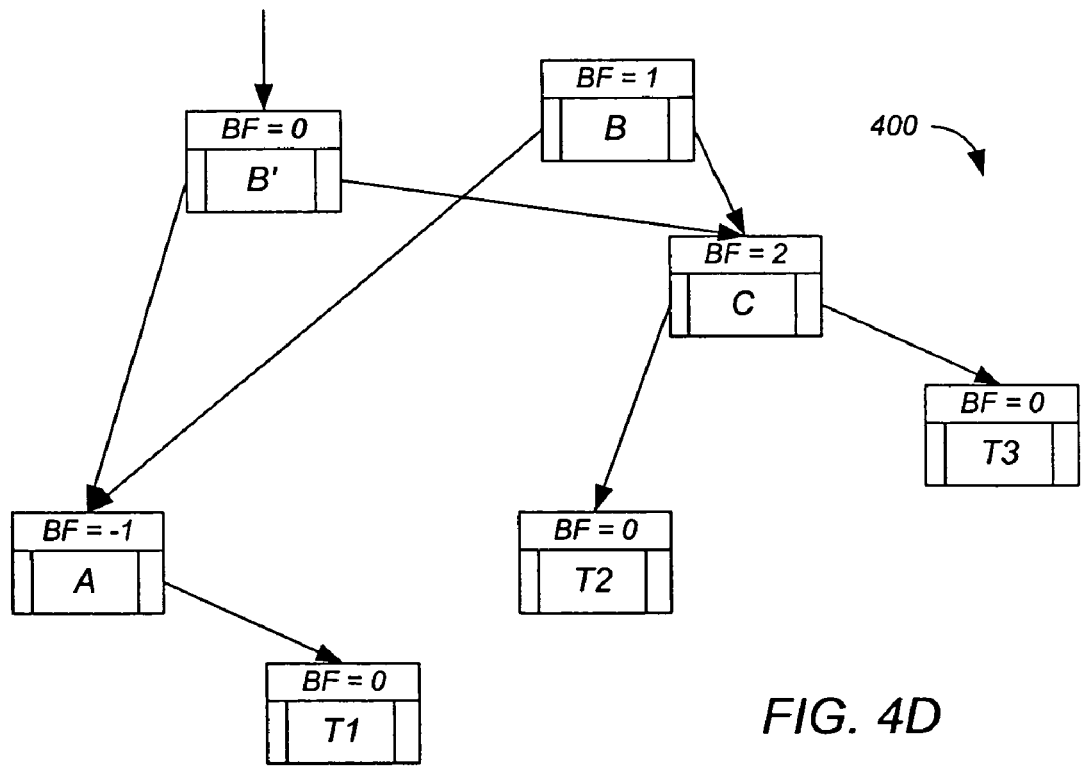
Figure 4E:
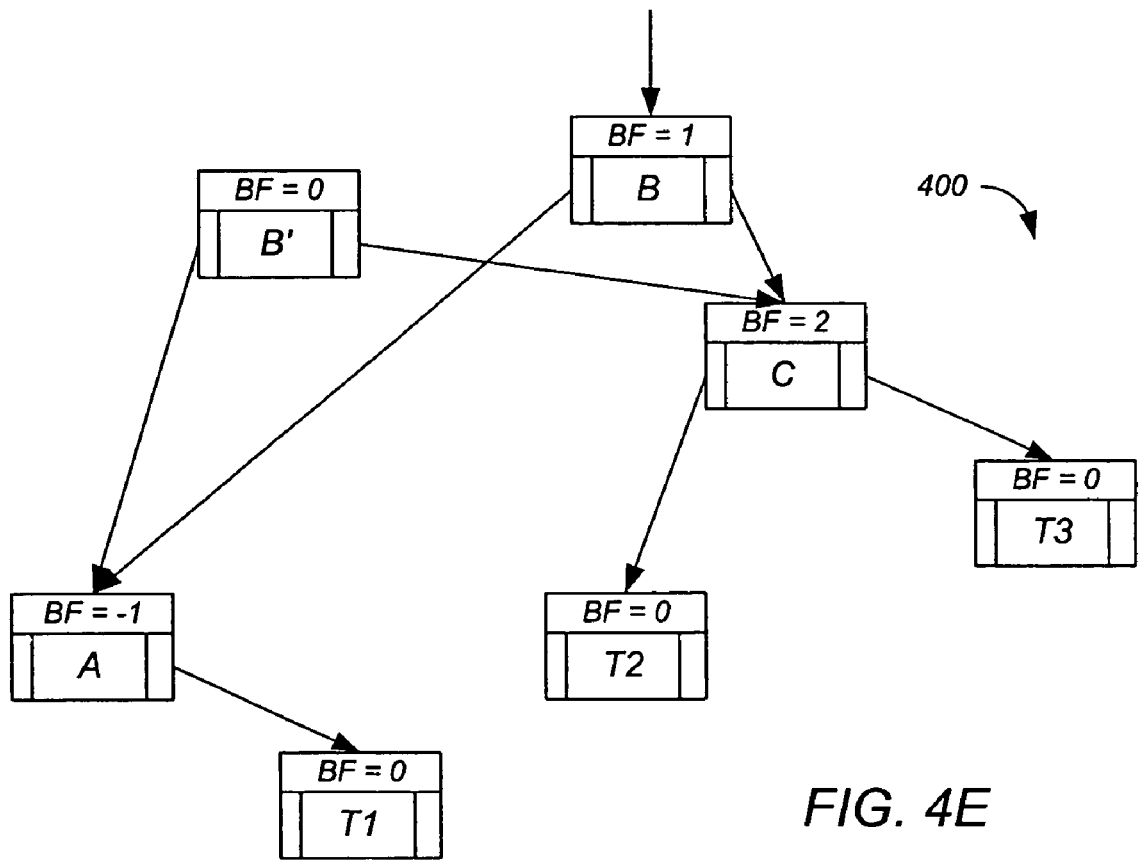
Figure 5:
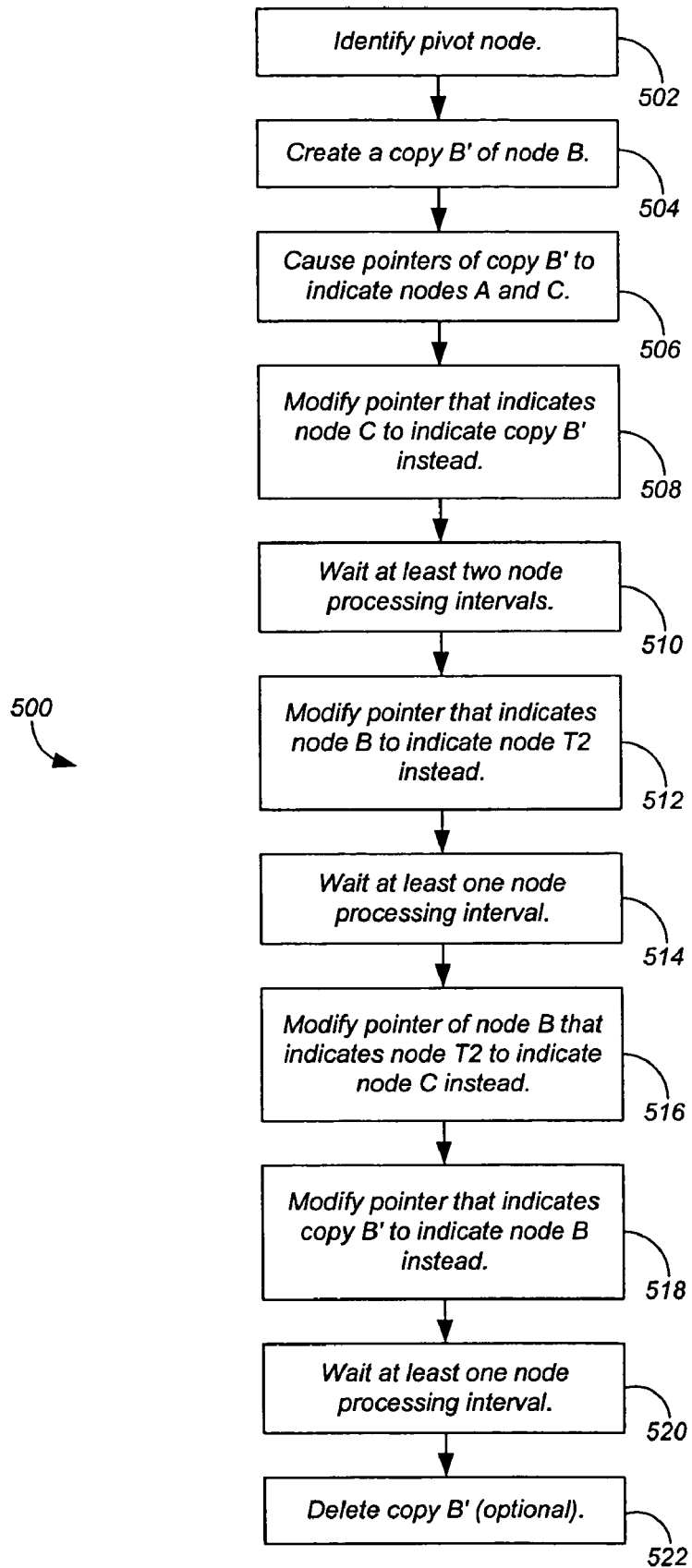
FIG. 5 shows a process for concurrently searching the AVL tree of FIG. 4 while performing a single rotation according to a preferred embodiment of the present invention.

FIG. 5 shows a process 500 for concurrently searching AVL tree 400 of FIG. 4 while performing a single LL rotation according to a preferred embodiment of the present invention. While process 500 describes an LL rotation, process 500 is easily modified to perform an RR rotation, as will be apparent to one skilled in the relevant arts after reading this description. Processor 106 first identifies a pivot node about which the AVL tree is to be rotated (step 502). Referring again to FIG. 4A, node T1 has just been inserted into tree 400, resulting in a balance factor BF=2 for node C, which indicates that tree 400 is left-heavy and should be rotated around pivot node C.

Processor 106 creates a copy B' of node B (step 504), and causes the pointers of copy B' to indicate nodes A and C (step 506). Processor 106 modifies the pointer that indicates node C to indicate copy B' instead (step 508). The resulting tree 400 is shown in FIG. 4B. Processor 106 then waits at least two node processing intervals (step 510) to allow classifier 104 to reach node B before modifying the pointer that indicates node B to indicate node T2 instead (step 512). As mentioned above, a node processing interval is the interval required by classifier 104 to process one of the nodes in tree 400. The resulting tree 400 is shown in FIG. 4C. Processor 106 then waits at least one node processing interval (step 514) to ensure classifier 104 is no longer processing node B before modifying the pointer of node B that indicates node T2 to indicate node C instead (step 516). The resulting tree 400 is shown in FIG. 4D. Processor 106 then modifies the pointer that indicates copy B' to indicate node B instead (step 518). The resulting tree 400 is shown in FIG. 4E. Processor 106 then optionally deletes copy B' (step 522) after waiting at least one additional processing interval (step 520). Alternatively, processor 106 can reuse node B' in a subsequent operation after waiting an additional node processing interval.

Figure 6A:
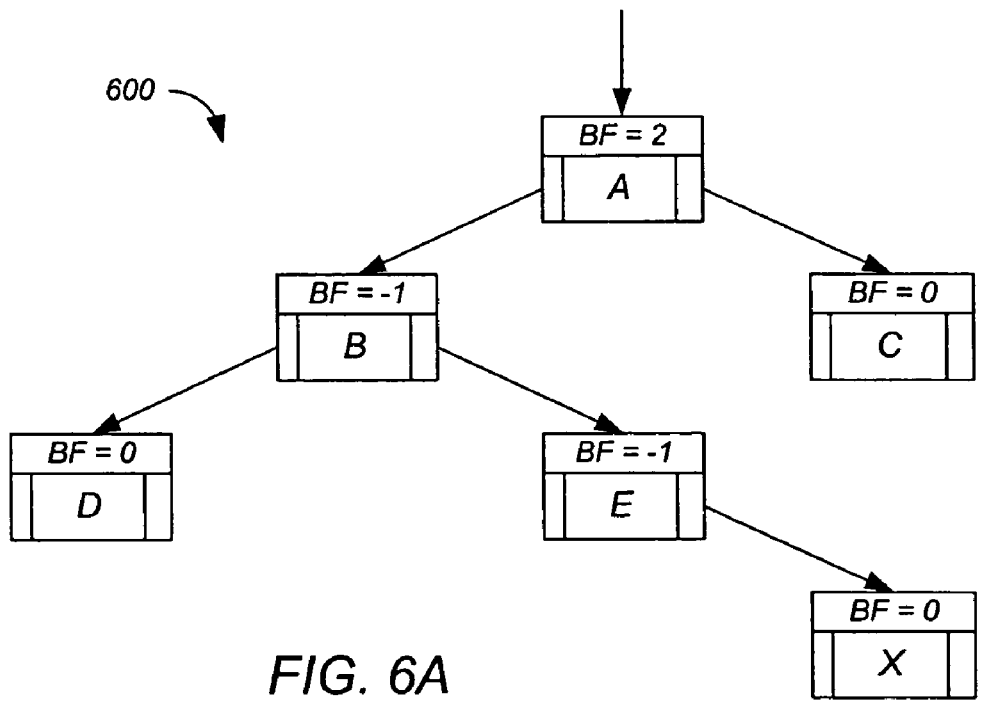
FIGS. 6A-E show a portion of an example binary AVL tree which is used to describe a double rotation operation such as a RL or LR rotation according to a preferred embodiment of the present invention.

FIGS. 6A-E show a portion of an example binary AVL tree 600 which is used to describe a double rotation operation such as a RL or LR rotation according to a preferred embodiment of the present invention. Referring to FIG. 6A, tree 600 comprises a node A that has a right pointer that indicates a node C and a left pointer that indicates a node B, which has a left pointer that indicates a node D and a right pointer that indicates a node E, which has a right pointer that indicates a node X. Note that the side of node B from which node E descends is not the same as the side of node A from which node B descends. In the depicted LL rotation example, that side is the left side, while in a RR rotation, that side would be the right side. Balance factors BF, computed according to conventional methods, are also shown for each node.

Figure 6B:
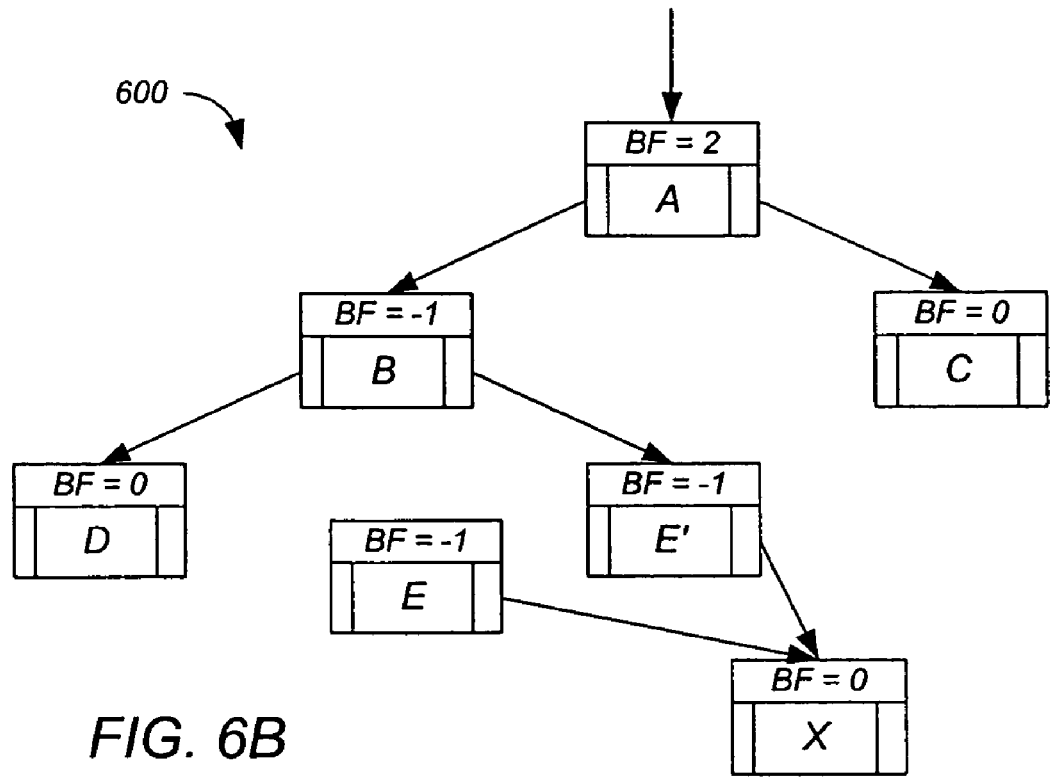
Figure 6C:
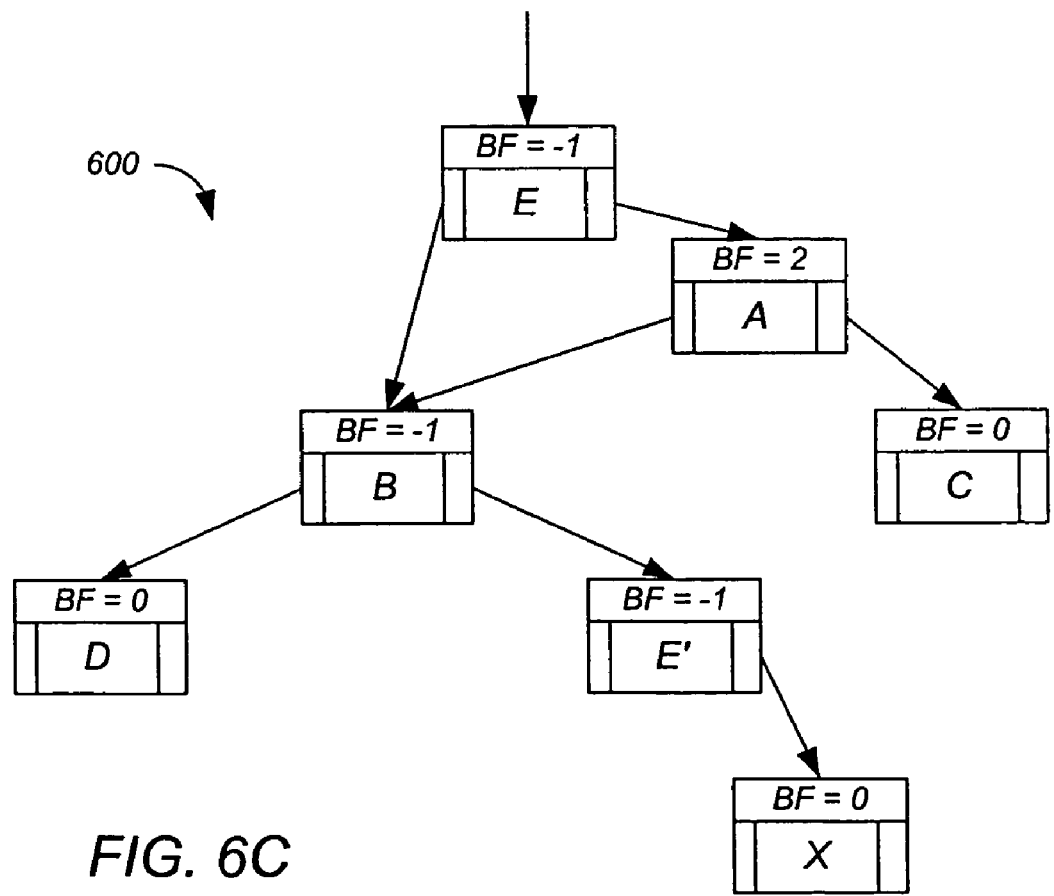
Figure 6D:
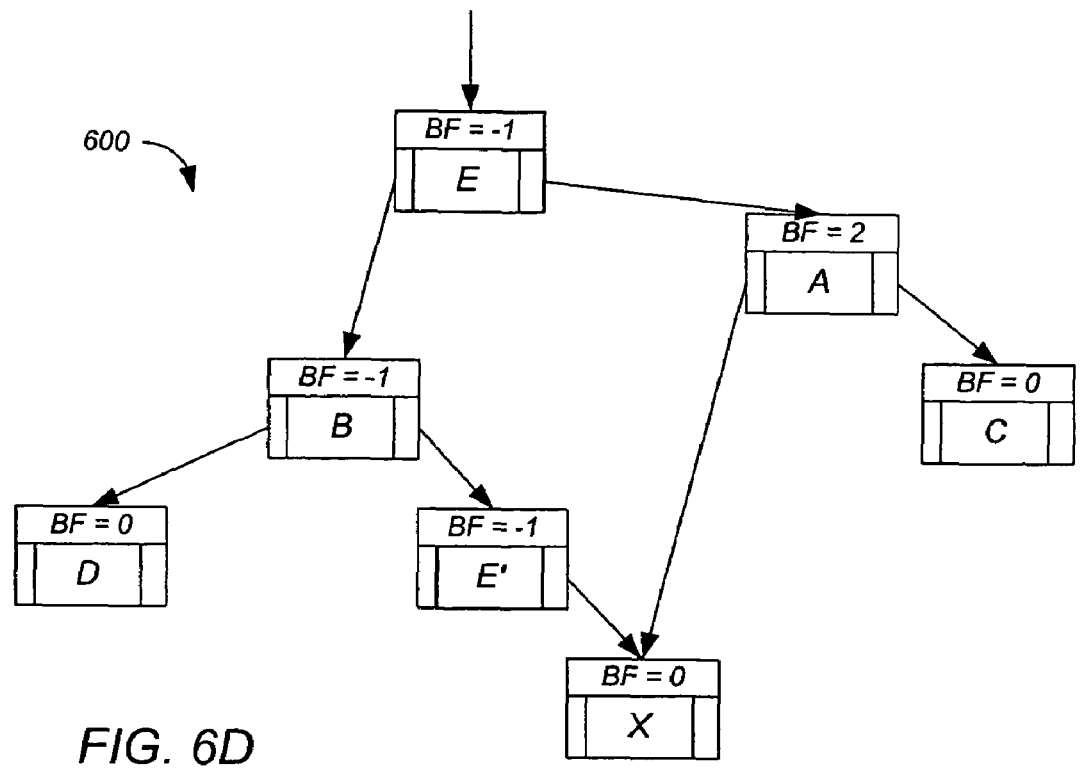
Figure 6E:
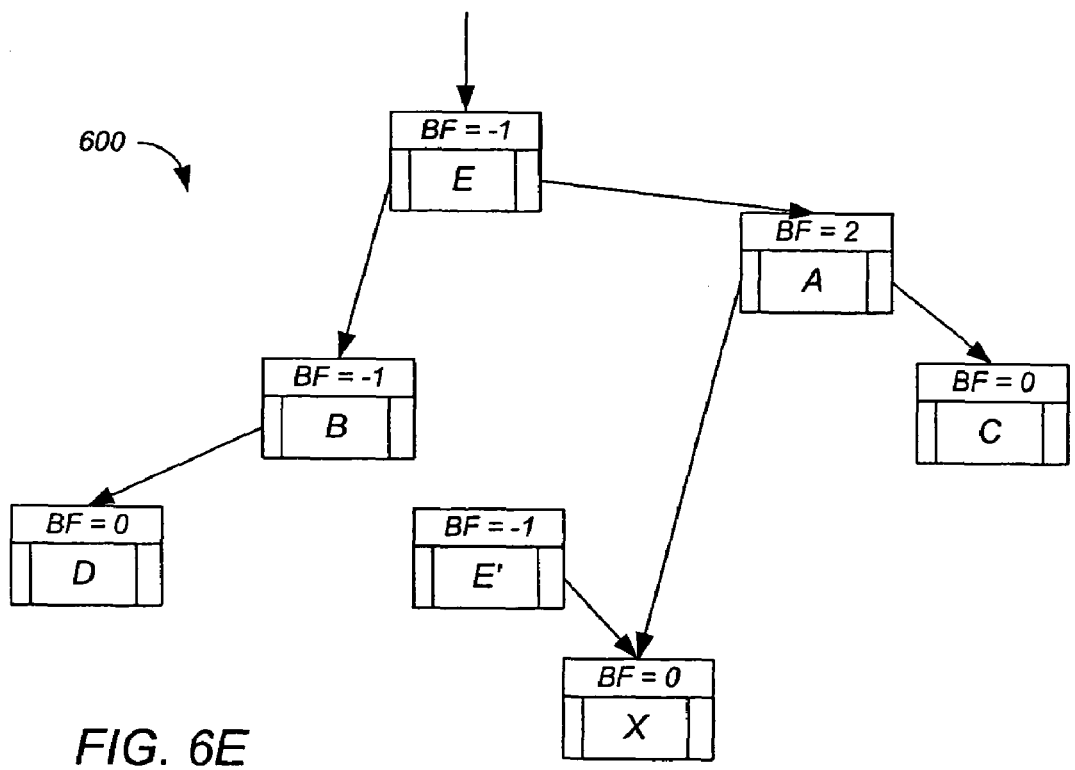
Figure 7:
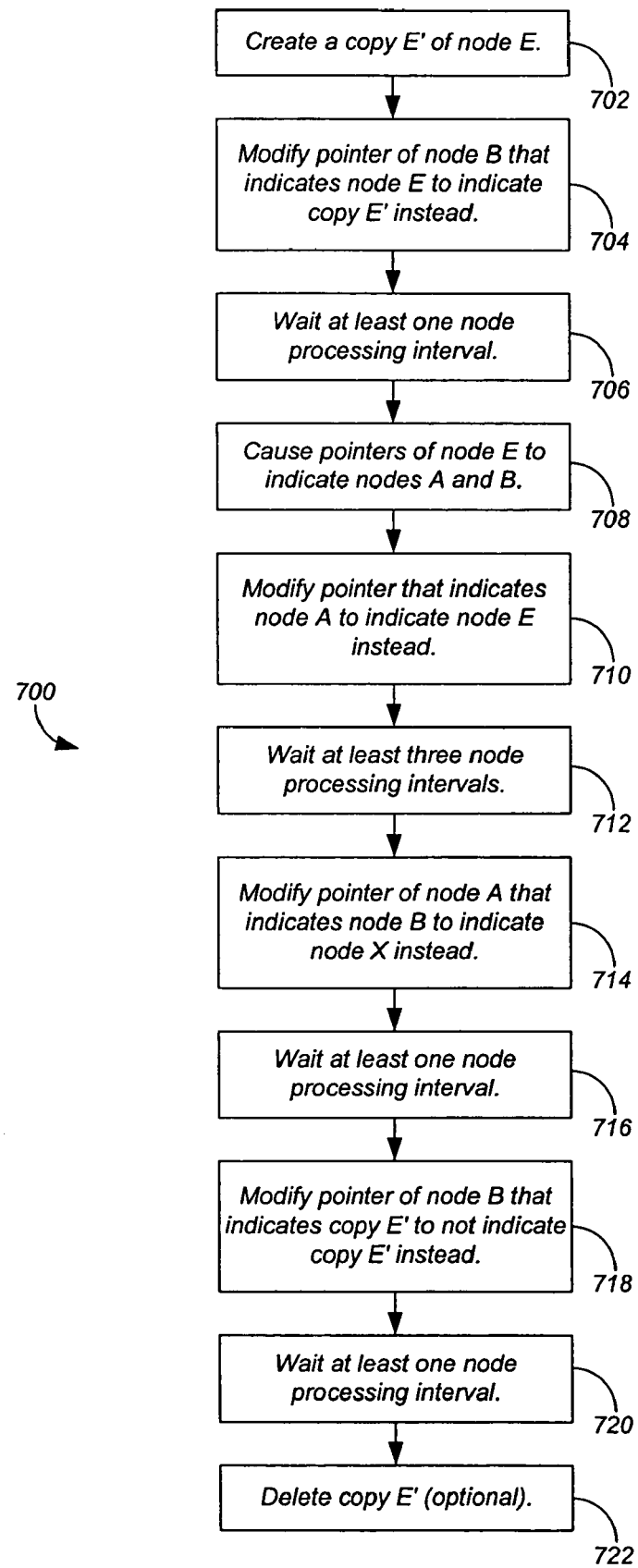
FIG. 7 shows a process for concurrently searching the AVL tree of FIG. 6 while performing a double rotation according to a preferred embodiment of the present invention.

FIG. 7 shows a process 700 for concurrently searching AVL tree 600 of FIG. 6 while performing a double rotation according to a preferred embodiment of the present invention. While process 700 describes an LR rotation, process 700 is easily modified to perform an RL rotation, as will be apparent to one skilled in the relevant arts after reading this description. Further, while a double rotation can be performed as two single rotations, process 700 uses fewer pointer operations. The balance factor for node A is BF=2, which indicates that tree 600 is left-heavy and should be rotated around pivot node A.

Processor 106 first creates a copy E' of node E (step 702) and modifies the pointer of node B that indicates node E to indicate copy E' instead (step 704). The resulting tree 600 is shown in FIG. 6B. Processor 106 then waits at least one node processing interval (step 706) to ensure that classifier 104 is no longer processing node E before causing the pointers of node E to indicate nodes A and B (step 708) and modifying the pointer that indicates node A to indicate node E instead (step 710). As mentioned above, a node processing interval is the interval required by classifier 104 to process one of the nodes in tree 600. The resulting tree 600 is shown in FIG. 6C. Processor 106 then waits at least three node processing intervals (step 712) to ensure that classifier 104 can find node E' before modifying the pointer of node A that indicates node B to indicate node X instead (step 714). The resulting tree 600 is shown in FIG. 6D. Processor 106 then waits at least one node processing interval (step 716) to ensure that classifier 104 is no longer processing copy E' before modifying the pointer of node B that indicates copy E' to not indicate copy E' instead (step 718). The resulting tree 600 is shown in FIG. 6E. Processor 106 then optionally deletes copy E' (step 722) after waiting at least one additional processing interval (step 720). Alternatively, processor 106 can reuse node E' in a subsequent operation after waiting an additional node processing interval.

Figure 8A:
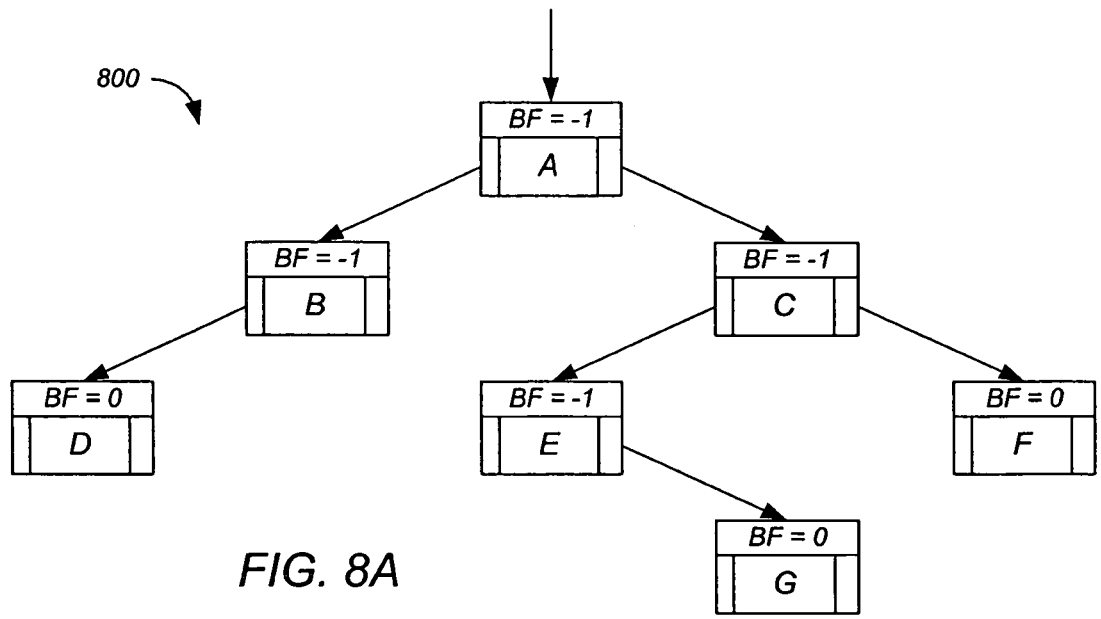
FIGS. 8A-D show a portion of an example binary AVL tree which is used to describe a node removal operation according to a preferred embodiment of the present invention.

FIGS. 8A-D show a portion of an example binary AVL tree 800 which is used to describe a node removal operation according to a preferred embodiment of the present invention. Referring to FIG. 8A, tree 800 comprises a node A that has a right pointer that indicates a node C and a left pointer that indicates a node B, which has a left pointer that indicates a node D. Node C has a right pointer that indicates a node F and a left pointer that indicates a node E, which has a right pointer that indicates a node G.

Figure 9:
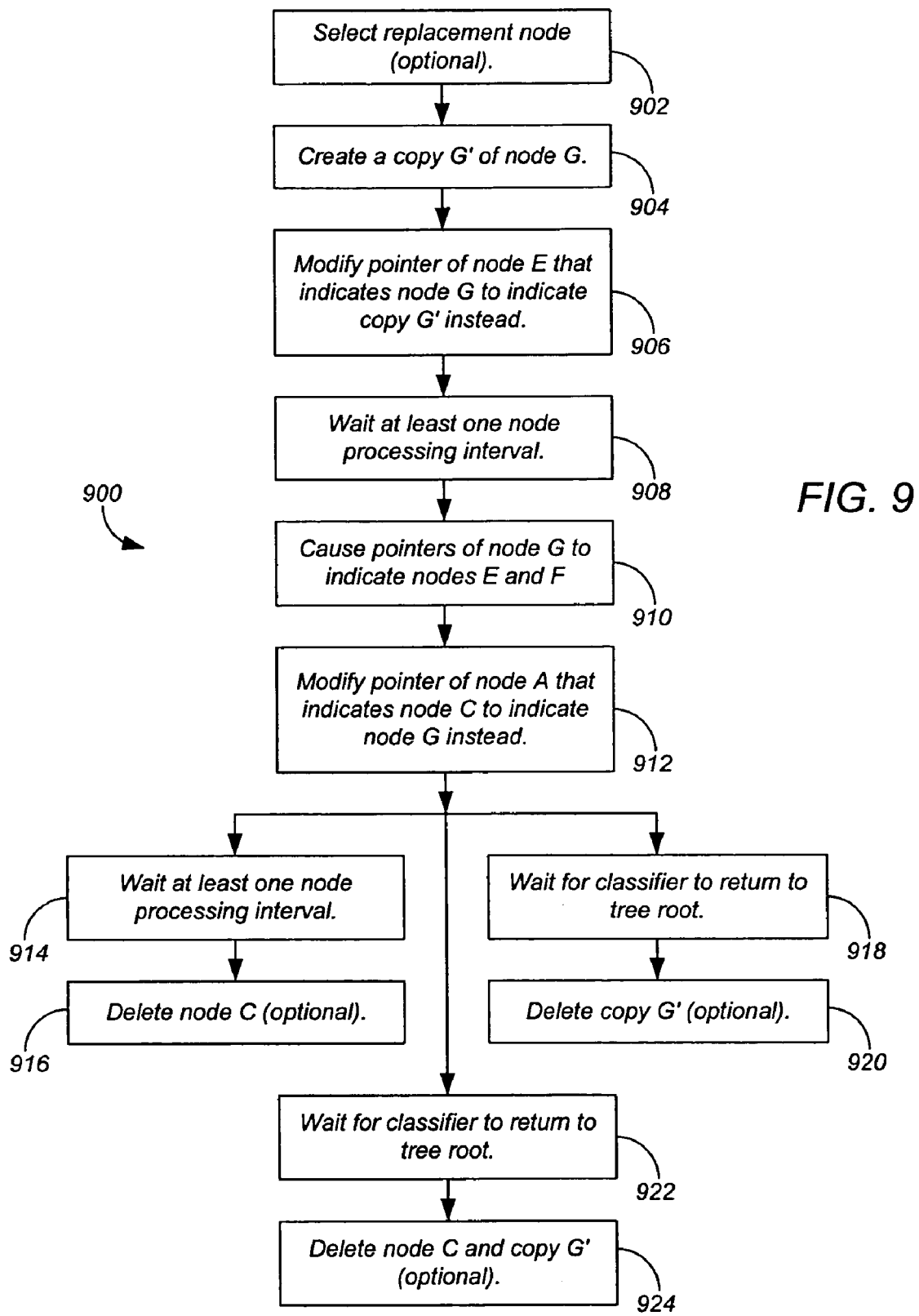
FIG. 9 shows a process for concurrently searching the AVL tree of FIG. 9 while removing a node according to a preferred embodiment of the present invention.

FIG. 9 shows a process 900 for concurrently searching AVL tree 900 of FIG. 9 while removing a node according to a preferred embodiment of the present invention. Referring again to FIG. 8A, node C should be deleted. Processor 106 optionally selects a replacement node with the value closest to the value of node C (step 902). In this example, the replacement node is node G. Preferably a replacement node (here, node G) is used only when the node to be deleted (here, node C) has two descendants (here, nodes E and F). Also, the replacement node has one descendant at most.

Figure 8B:
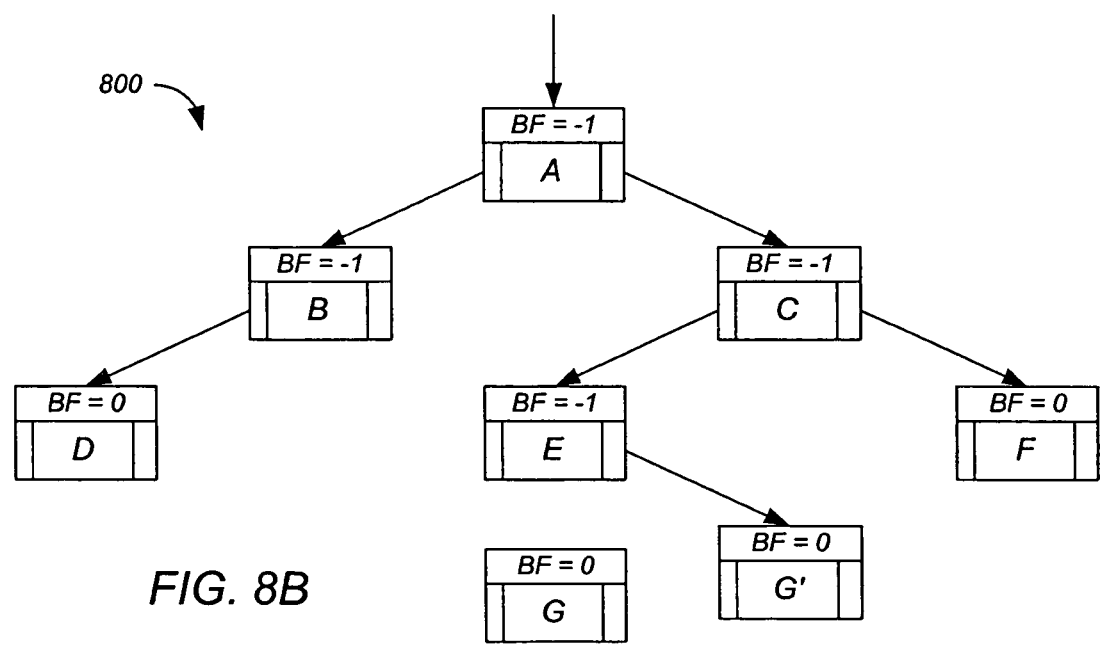
Figure 8C:
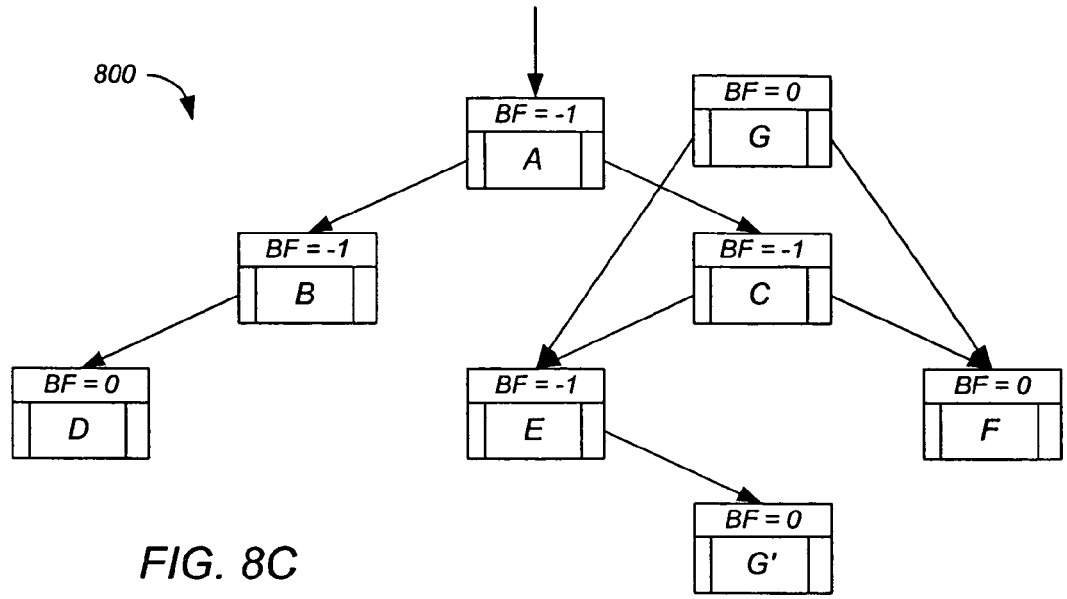
Figure 8D:
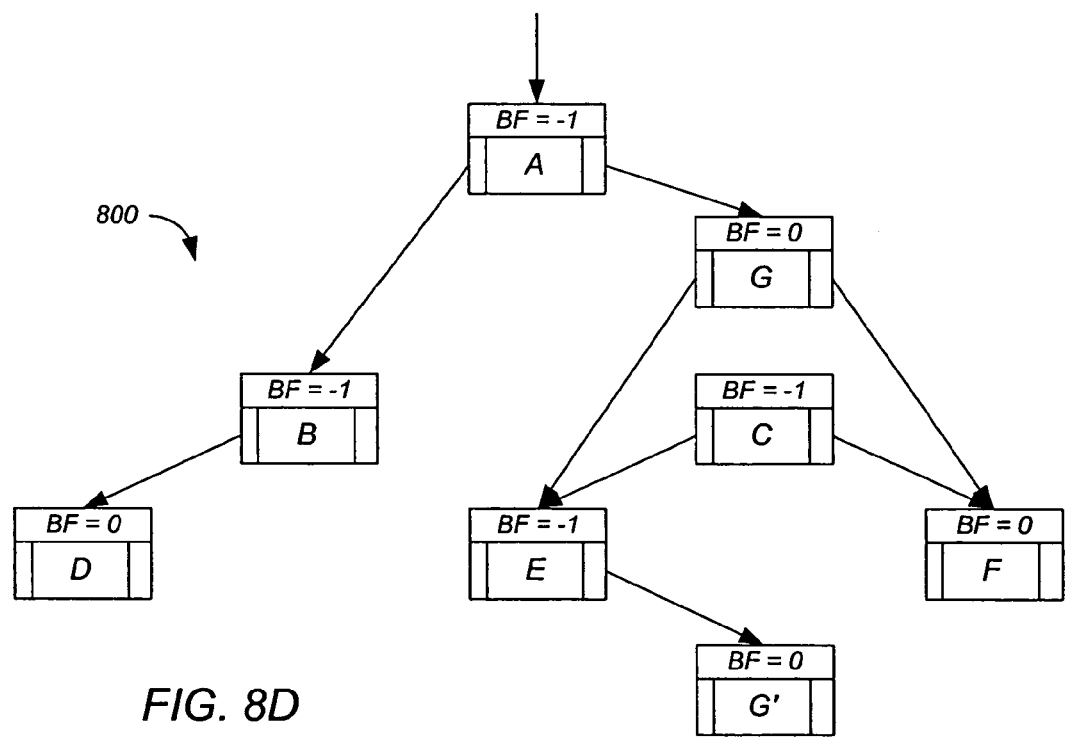

Processor 106 creates a copy G' of node G (step 904) and modifies the pointer of node E that indicates node G to indicate copy G' instead (step 906). The copied node (here, node G'), is a descendant of the node to be deleted (here, node C), but need not be a direct descendant of node C. For example, one or more nodes (here, node E), can be between the two nodes (here, nodes C and G'). The resulting tree 800 is shown in FIG. 8B. Processor 106 then waits at least one node processing interval (step 908) to ensure that classifier 104 is no longer processing node G before causing the pointers of node G to indicate nodes E and F (step 910). A node processing interval is the interval required by classifier 104 to process one of the nodes in tree 900. The resulting tree 800 is shown in FIG. 8C. Processor 106 then modifies the pointer of node A that indicates node C to indicate node G instead (step 912). The resulting tree 800 is shown in FIG. 8D.

Processor 106 optionally deletes node C (step 916) after waiting at least one additional node processing interval (step 914). Processor 106 optionally deletes copy G' (step 920) after waiting for classifier 104 to return to the root of tree 800 (step 918). Alternatively, processor 106 modifies the pointer of node E that indicates copy G' to indicate a descendant of copy G' instead. Processor 106 optionally deletes node C and copy G' (step 924) after waiting for classifier 104 to return to the root of tree 800 (step 922).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
    a memory comprising a plurality of locations, each location to store a node for a binary tree comprising a plurality of the nodes;
    a classifier to search the binary tree, wherein the classifier requires one node processing interval to process one of the nodes; and
    a processor to modify the binary tree while the classifier searches the binary tree, wherein the processor
    (a) identifies a first one of the nodes about which the binary tree is to be rotated, wherein a second one of the nodes is a descendant of the first one of the nodes and has a first pointer that indicates a third one of the nodes and a second pointer that indicates a fourth one of the nodes, and wherein a side of the second one of the nodes from which the third one of the nodes descends is the same as a side of the first one of the nodes from which the second one of the nodes descends;
    (b) creates a copy of the second one of the nodes;
    (c) causes pointers of the copy to indicate the first and third nodes;
    (d) modifies a pointer that indicates the first one of the nodes to indicate the copy instead;
    (e) after (d), waiting at least two node processing intervals;
    (f) after (e), modifies a pointer that indicates the second one of the nodes to indicate the fourth one of the nodes instead;
    (g) after (f), waits at least one node processing interval;
    (h) modifies the second pointer to indicate the first one of the nodes instead; and
    (i) modifies a pointer that indicates the copy to indicate the second one of the nodes instead.

2. The apparatus of claim 1, wherein the binary tree is selected from the group consisting of:
    an AVL tree; and
    a red and black tree.

3. The apparatus of claim 1, wherein, after (i), the processor waits at least one node processing interval, and then deletes the copy.

4. The apparatus of claim 1, further comprising:
    an arbiter to control access to the memory by the processor.

5. The apparatus of claim 1, further comprising:
    an offload engine;
    a non-offload queue; and
    a receive circuit to receive packets of data;
    wherein the classifier directs each of the packets of data to one of the offload engine and the non-offload queue according to the binary tree.

6. The apparatus of claim 5, wherein the receive circuit comprises a media access controller.

7. A method for performing a single rotation in a binary tree comprising a plurality of nodes, wherein the binary tree is accessed by a search process that requires one node processing interval to process one of the nodes during the signal rotation, the method comprising:
    (a) identifying a first one of the nodes about which the binary tree is to be rotated, wherein a second one of the nodes is a descendant of the first one of the nodes and has a first pointer that indicates a third one of the nodes and a second pointer that indicates a fourth one of the nodes, and wherein a side of the second one of the nodes from which the third one of the nodes descends is the same as a side of the first one of the nodes from which the second one of the nodes descends;
    (b) creating a copy of the second one of the nodes;
    (c) causing pointers of the copy to indicate the first and third nodes;
    (d) modifying a pointer that indicates the first one of the nodes to indicate the copy instead;
    (e) after step (d), waiting at least two node processing intervals;
    (f) after step (e), modifying a pointer that indicates the second one of the nodes to indicate the fourth one of the nodes instead;
    (g) after step (f), waiting at least one node processing interval;
    (h) modifying the second pointer to indicate the first one of the nodes instead; and
    (i) modifying a pointer that indicates the copy to indicate the second one of the nodes instead.

8. The method of claim 7, wherein the binary tree is selected from the group consisting of:
    an AVL tree; and
    a red and black tree.

9. The method of claim 7, further comprising:
    (j) after step (i), waiting at least one node processing interval, and then
    (k) deleting the copy.

10. An apparatus comprising:
    a memory comprising a plurality of locations, each location to store a node for a binary tree comprising a plurality of the nodes;
    a classifier to search the binary tree, wherein the classifier requires one node processing interval to process one of the nodes; and
    a processor to modify the binary tree while the classifier searches the binary tree, wherein the processor
    (a) creates a copy of a first one of the nodes, wherein the first one of the nodes has a pointer that indicates a second one of the nodes;
    (b) modifies a pointer of a third one of the nodes that indicates the first one of the nodes to indicate the copy instead;
    (c) after (b), waits at least one node processing interval;
    (d) after (c), causes pointers of the first one of the nodes to indicate the third one of the nodes and a fourth one of the nodes, wherein the fourth one of the nodes has a pointer that indicates the third one of the nodes, and wherein a side of the third one of the nodes from which the first one of the nodes descends is not the same as a side of the fourth one of the nodes from which the third one of the nodes descends;
(e) modifies a pointer that indicates the fourth one of the nodes to indicate the first one of the nodes instead;
(f) after (e), waits at least three node processing intervals;
(g) after (f), modifies the pointer of the fourth one of the nodes that indicates the third one of the nodes to indicate the second one of the nodes instead;
(h) after (g), waits at least one node processing interval; and
(i) after (h), modifies a pointer that indicates the copy to not indicate the copy instead.

11. The apparatus of claim 10, wherein the binary tree is selected from the group consisting of:
an AVL tree; and
a red and black tree.

12. The apparatus of claim 10, wherein, after step (i), the processor waits at least one node processing interval, and then deletes the copy.

13. The apparatus of claim 10, further comprising:
an arbiter to control access to the memory by the processor.

14. The apparatus of claim 10, further comprising:
an offload engine;
a non-offload queue; and
a receive circuit to receive packets of data;
wherein the classifier directs each of the packets of data to one of the offload engine and the non-offload queue according to the binary tree.

15. The apparatus of claim 14, wherein the receive circuit comprises a media access controller.

16. A method of modifying a binary tree comprising a plurality of nodes, wherein the binary tree is accessed by a search process that requires one node processing interval to process one of the nodes during the modification of the binary tree, the method comprising:
(a) creating a copy of a first one of the nodes, wherein the first one of the nodes has a pointer that indicates a second one of the nodes;
(b) modifying a pointer of a third one of the nodes that indicates the first one of the nodes to indicate the copy instead;
(c) after step (b), waiting at least one node processing interval;
(d) after step (c), causing pointers of the first one of the nodes to indicate the third one of the nodes and a fourth one of the nodes, wherein the fourth one of the nodes has a pointer that indicates the third one of the nodes, and wherein a side of the third one of the nodes from which the first one of the nodes descends is not the same as a side of the fourth one of the nodes from which the third one of the nodes descends;
(e) modifying a pointer that indicates the fourth one of the nodes to indicate the first one of the nodes instead;
(f) after step (e), waiting at least three node processing intervals;
(g) after step (f), modifying the pointer of the fourth one of the nodes that indicates the third one of the nodes to indicate the second one of the nodes instead;
(h) after step (g), waiting at least one node processing interval; and
(i) after step (h), modifying a pointer that indicates the copy to not indicate the copy instead.

17. The method of claim 16, wherein the binary tree is selected from the group consisting of:
an AVL tree; and
a red and black tree.

18. The method of claim 16, further comprising:
(j) after step (i), waiting at least one node processing interval, and then
(k) deleting the copy.

19. An apparatus comprising:
a memory comprising a plurality of locations, each location to store a node for a binary tree comprising a plurality of the nodes;
a classifier to search the binary tree, wherein the classifier requires one node processing interval to process one of the nodes; and
a processor to modify the binary tree while the classifier searches the binary tree, wherein the processor
(a) modifies a pointer that indicates a first one of the nodes to not indicate the first one of the nodes instead, wherein a second one of the nodes is a descendant of the first one of the nodes and is separated from the first one of the nodes by N pointers,
(b) waits at least N+1 node processing intervals after (a), and
(c) after (b), modifies a pointer that indicates the second one of the nodes to not indicate the second one of the nodes instead.

20. The apparatus of claim 19, wherein the binary tree is selected from the group consisting of:
an AVL tree; and
a red and black tree.

21. The apparatus of claim 19, further comprising:
an arbiter to control access to the memory by the processor.

22. The apparatus of claim 19, further comprising:
an offload engine;
a non-offload queue; and
a receive circuit to receive packets of data;
wherein the classifier directs each of the packets of data to one of the offload engine and the non-offload queue according to the binary tree.

23. The apparatus of claim 22, wherein the receive circuit comprises a media access controller.

24. A method for modifying a binary tree comprising a plurality of nodes, wherein the binary tree is accessed by a search process that requires one node processing interval to process one of the nodes during the modification of the binary tree, the method comprising:
(a) modifying a pointer that indicates a first one of the nodes of the binary tree to not indicate the first one of the nodes instead, wherein a second one of the nodes is a descendant of the first one of the nodes and is separated from the first one of the nodes by N pointers;
(b) waiting at least N+1 node processing intervals after step (a); and
(c) after step (b), modifying a pointer that indicates the second one of the nodes to not indicate the second one of the nodes instead.

25. The method of claim 24, wherein the binary tree is selected from the group consisting of:
an AVL tree; and
a red and black tree.

26. An apparatus comprising:
a memory comprising a plurality of locations, each location to store a node for a binary tree comprising a plurality of the nodes;
a classifier to search the binary tree, wherein the classifier requires one node processing interval to process one of the nodes; and
a processor to modify the binary tree while the classifier searches the binary tree, wherein the processor
(a) identifies a first one of the nodes;

(b) creates a copy of a second one of the nodes, wherein the second one of the nodes is a descendant of the first one of the nodes,
(c) modifies a pointer that indicates the second one of the nodes to indicate the copy instead,
(d) after (c), waits at least one node processing interval,
(e) after (d), causes the pointers of the second one of the nodes to indicate nodes indicated by pointers of the first one of the nodes, and
(f) modifies a pointer that indicates the first one of the nodes to indicate the second one of the nodes instead.

27. The apparatus of claim 26, wherein the binary tree is selected from the group consisting of:
an AVL tree; and
a red and black tree.

28. The apparatus of claim 26, wherein, after step (f), the processor waits at least one node processing interval, and then deletes the first one of the nodes.

29. The apparatus of claim 26, wherein the processor deletes the copy.

30. The apparatus of claim 29, wherein the processor does not delete the copy until the classifier returns to a root of the binary tree.

31. The apparatus of claim 30, wherein the processor deletes the first one of the nodes after the classifier returns to the root of the binary tree.

32. The apparatus of claim 26, wherein the processor modifies a pointer that indicates the copy to indicate a descendant of the copy instead.

33. The apparatus of claim 26, wherein the processor selects the second one of the nodes for deletion according to values of the nodes.

34. The apparatus of claim 26, further comprising:
an arbiter to control access to the memory by the classifier and the processor.

35. The apparatus of claim 26, further comprising:
an offload engine;
a non-offload queue; and
a receive circuit to receive packets of data;
wherein the classifier directs each of the packets of data to one of the offload engine and the non-offload queue according to the binary tree.

36. The apparatus of claim 35, wherein the receive circuit comprises a media access controller.

37. A method for removing a first node from a binary tree comprising a plurality of the nodes, wherein the binary tree is accessed by a search process that requires one node processing interval to process one of the nodes during removal of the first node, the method comprising:
(a) creating a copy of a second one of the nodes, wherein the second one of the nodes is a descendant of the first node;
(b) modifying a pointer that indicates the second one of the nodes to indicate the copy instead;
(c) after step (b), waiting at least one node processing interval;
(d) after step (c), causing the pointers of the second one of the nodes to indicate nodes indicated by pointers of the first node; and
(e) modifying a pointer that indicates the first node to indicate the second one of the nodes instead.

38. The method of claim 37, wherein the binary tree is selected from the group consisting of:
an AVL tree; and
a red and black tree.

39. The method of claim 37, further comprising:
(f) after step (e), waiting at least one node processing interval, and then
(g) deleting the first node.

40. The method of claim 37, further comprising:
deleting the copy.

41. The method of claim 40, further comprising:
after step (e), waiting for the search process to return to a root of the binary tree before deleting the copy.

42. The method of claim 41, further comprising:
deleting the first node after the search process returns to the root of the binary tree.

43. The method of claim 37, further comprising:
modifying a pointer that indicates the copy to indicate a descendant of the copy instead.

44. The method of claim 37, further comprising:
selecting the second one of the nodes for deletion according to values of the nodes.

* * * * *